US006871672B2

(12) United States Patent
Kurokawa et al.

(10) Patent No.: US 6,871,672 B2
(45) Date of Patent: Mar. 29, 2005

(54) BELLOWS-TYPE HYDRAULIC ACCUMULATOR

(75) Inventors: Ryugo Kurokawa, Hekinan (JP); Yoichi Adachi, Chiryu (JP)

(73) Assignee: Advics Co., Ltd., Kariya (JP)

( * ) Notice: Subject to any disclaimer, the term of this patent is extended or adjusted under 35 U.S.C. 154(b) by 1 day.

(21) Appl. No.: 10/662,395

(22) Filed: Sep. 16, 2003

(65) Prior Publication Data

US 2004/0055656 A1 Mar. 25, 2004

(30) Foreign Application Priority Data

Sep. 19, 2002 (JP) ........................................ 2002-272651

(51) Int. Cl.[7] .............................................. F16L 55/04
(52) U.S. Cl. ............................ 138/31; 138/30; 138/26; 303/87; 220/721
(58) Field of Search .............................. 138/31, 30, 26; 303/87, 113.2–113.4, 115.4; 220/721, 723, 720

(56) References Cited

U.S. PATENT DOCUMENTS

| | | | | | |
|---|---|---|---|---|---|
| 3,456,673 | A | * | 7/1969 | Legrand | 137/202 |
| 3,695,297 | A | * | 10/1972 | Ferrentino | 138/30 |
| 4,997,009 | A | * | 3/1991 | Niikura et al. | 138/30 |
| 5,205,326 | A | * | 4/1993 | Paley et al. | 138/30 |
| 5,638,868 | A | * | 6/1997 | Loran | 138/31 |
| 5,924,196 | A | * | 7/1999 | Sasaki et al. | 29/890.06 |
| 6,012,491 | A | * | 1/2000 | Mohr et al. | 138/30 |
| 6,056,013 | A | * | 5/2000 | Sasaki et al. | 138/31 |
| 6,076,558 | A | * | 6/2000 | Mohr et al. | 303/115.4 |
| 6,189,572 | B1 | * | 2/2001 | Ruffer et al. | 138/30 |
| 6,209,583 | B1 | * | 4/2001 | Mohr et al. | 138/30 |
| 6,286,552 | B1 | * | 9/2001 | Shimbori et al. | 138/31 |
| 6,494,545 | B2 | * | 12/2002 | Nakamura et al. | 303/87 |
| 6,525,290 | B2 | * | 2/2003 | Shimbori et al. | 219/91.23 |
| 6,616,247 | B2 | * | 9/2003 | Mohr | 303/87 |
| 6,644,354 | B2 | * | 11/2003 | Dinkel et al. | 138/30 |
| 6,666,529 | B2 | * | 12/2003 | Mohr | 303/87 |
| 6,789,576 | B2 | * | 9/2004 | Umetsu et al. | 138/30 |
| 6,805,166 | B2 | * | 10/2004 | Suzuki et al. | 138/31 |
| 6,810,915 | B2 | * | 11/2004 | Umetsu et al. | 138/31 |
| 2002/0035832 | A1 | | 3/2002 | Nakamura et al. | 303/87 |

FOREIGN PATENT DOCUMENTS

| | | |
|---|---|---|
| DD | 37 07 803 A1 | 9/1988 |
| EP | 0 391 320 A1 | 10/1990 |
| JP | 03-009194 A | 1/1991 |
| JP | 2001-116003 | 4/2001 |

* cited by examiner

Primary Examiner—Patrick Brinson
(74) Attorney, Agent, or Firm—Burns, Doane, Swecker & Mathis, L.L.P.

(57) ABSTRACT

A bellows-type hydraulic accumulator includes a shell, a bellows unit, and a stay in order to accumulate pressurized liquid within a liquid chamber, divided into a fixed-volume liquid chamber and a variable-volume liquid chamber communicating with the fixed-volume liquid chamber via a communication port formed in the stay. A pipe is inserted into a liquid inlet/outlet port communicating with the fixed-volume liquid chamber, to thereby form an inflow passage inside the pipe and an outflow passage outside the pipe. A tip end of the pipe is located within the communication port of the stay with a predetermined radial clearance formed between the tip end and a wall surface of the communication port, to thereby enable pressurized liquid to be supplied to the variable-volume liquid chamber from the tip end of the pipe and to be discharged from the variable-volume liquid chamber to the fixed-volume liquid chamber via the radial clearance.

2 Claims, 3 Drawing Sheets

Distance D between tip end surface of pipe
and end of communication port of stay facing
toward variable-volume liquid chamber (mm)

BELLOWS-TYPE HYDRAULIC ACCUMULATOR

BACKGROUND OF THE INVENTION

1. Field of the Invention

The present invention relates to a bellows-type hydraulic accumulator capable of absorbing a pulsation component from pressurized liquid.

2. Description of the Related Art

A conventional hydraulic accumulator of the described type includes a shell that defines a pressure space, a bellows unit that can be extended and contracted and is disposed within the pressure space, and a stay that has a communication port and is disposed within the bellows unit. One end of the bellows unit is fixedly secured to one end wall of the shell in order to divide the pressure space into an outer chamber serving as a gas chamber, in which a pressurized gas is enclosed, and an inner chamber serving as a liquid chamber communicating with a liquid inlet/outlet port formed in the end wall of the shell. The stay is disposed in the liquid chamber in order to restrict the degree of contraction of the bellows unit and to divide the liquid chamber into a fixed-volume liquid chamber having a fixed volume and a variable-volume liquid chamber whose volume is variable and which communicates with the fixed-volume liquid chamber via the communication port (see, for example, Japanese Patent Application Laid-Open (kokai) No. 2001-116003).

The above-described conventional bellows-type hydraulic accumulator operates as follows. Pressurized liquid discharged from a pump and containing a pulsation component which will cause vibration and noise flows into the accumulator via the liquid inlet/outlet port formed in the end wall of the shell. In the accumulator, the pressurized liquid flows from the fixed-volume liquid chamber formed between the shell and the stay to the variable-volume liquid chamber formed between the bellows unit and the stay via the communication port of the stay. The pressurized liquid having flowed into the variable-volume liquid chamber flows to the fixed-volume liquid chamber via the communication port of the stay, and then flows to the outside of the accumulator via the liquid inlet/outlet port formed in the end wall of the shell. Therefore, the pressurized liquid discharged from the pump and containing a pulsation component hardly flows into the variable-volume liquid chamber of the accumulator, and therefore, the accumulator may fail to efficiently absorb the pulsation component of the pressurized liquid discharged from the pump, which component is a cause of generation of vibration and noise.

SUMMARY OF THE INVENTION

In view of the above-described problems, an object of the present invention is to provide a hydraulic accumulator that can efficiently absorb a pulsation component of pressurized liquid discharged from a pump, which component would otherwise cause generation of vibration and noise.

In order to achieve the above object, the present invention provides a bellows-type hydraulic accumulator comprising a shell which defines a pressure space, and a bellows unit capable of extending and contracting and disposed within the pressure space. One end of the bellows unit is fixedly secured to one end wall of the shell in order to divide the pressure space into an outer chamber serving as a gas chamber, in which a pressurized gas is enclosed, and an inner chamber serving as a liquid chamber communicating with a liquid inlet/outlet port formed in the end wall of the shell. The bellows-type hydraulic accumulator further comprises a stay which has a communication port formed therein and is disposed within the bellows unit in order to restrict the degree of contraction of the bellows unit and to divide the liquid chamber into a fixed-volume liquid chamber having a fixed volume and a variable-volume liquid chamber whose volume is variable and which communicates with the fixed-volume liquid chamber via the communication port. A pipe is inserted into the liquid inlet/outlet port in order to form an inflow passage inside the pipe and an outflow passage outside the pipe. A tip end of the pipe is located within the communication port of the stay with a predetermined radial clearance formed between the tip end and a wall surface of the communication port, to thereby enable pressurized liquid to be supplied to the variable-volume liquid chamber from the tip end of the pipe and to be discharged from the variable-volume liquid chamber to the fixed-volume liquid chamber via the radial clearance.

In the bellows-type hydraulic accumulator of the present invention, pressurized liquid is supplied to the variable-volume liquid chamber from the tip end of the pipe inserted into the communication port of the stay, and is discharged from the variable-volume liquid chamber to the fixed-volume liquid chamber via the radial clearance formed between the pipe and the wall surface of the communication port. Therefore, pressurized liquid discharged from a pump and containing a pulsation component flows smoothly into the variable-volume liquid chamber of the accumulator and flows smoothly out therefrom, whereby the pulsation component of the pressurized liquid discharged from the pump, which component would otherwise cause generation of vibration and noise, is absorbed efficiently through expansion and contraction of the bellows unit.

Preferably, the distance between the end of the communication port facing toward the variable-volume liquid chamber and a tip end surface of the pipe is set to 0 to 1.5 mm. In this case, as is apparent from the results of a vibration measurement shown in FIG. 4, the pulsation component of pressurized liquid is absorbed quite efficiently through expansion and contraction of the bellows, whereby vibration which is caused by the pulsation component of the pressurized liquid can be reduced remarkably.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

Figure 1:
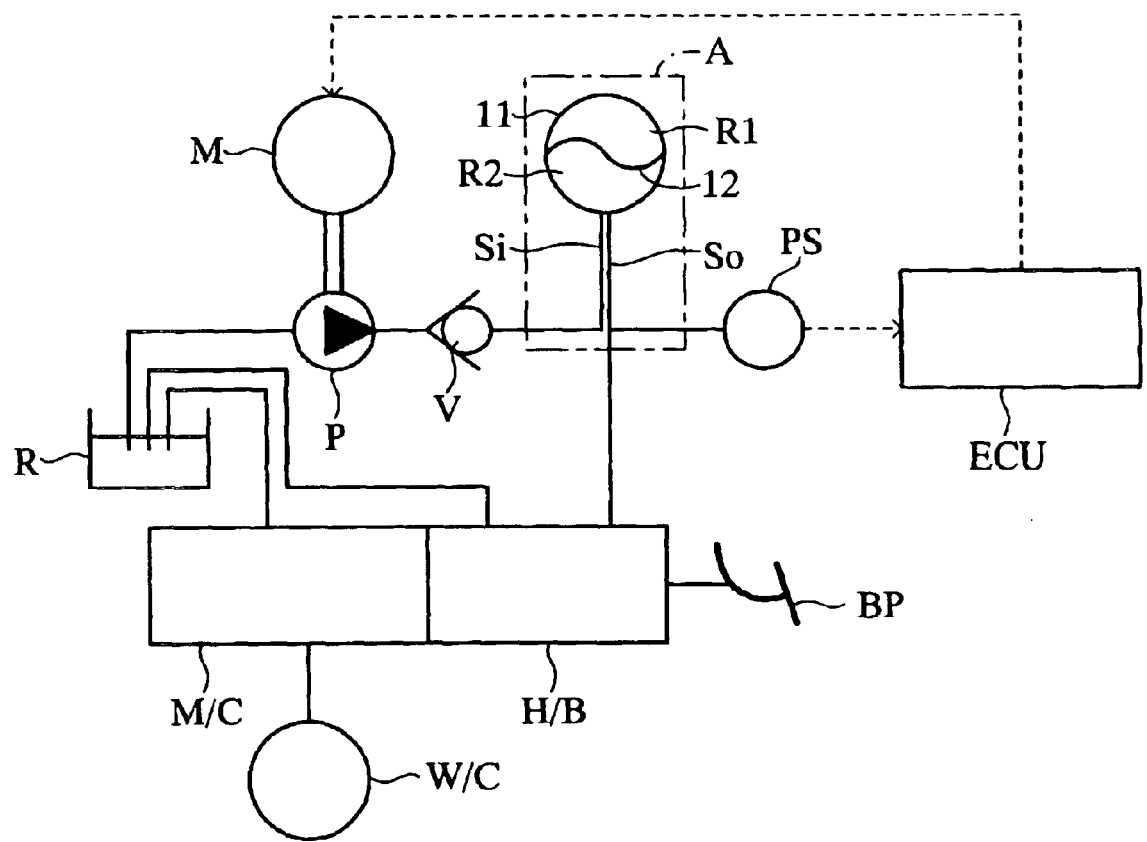
FIG. 1 is a diagram showing a hydraulic circuit which includes a bellows-type hydraulic accumulator according to an embodiment of the present invention.
Figure 2:
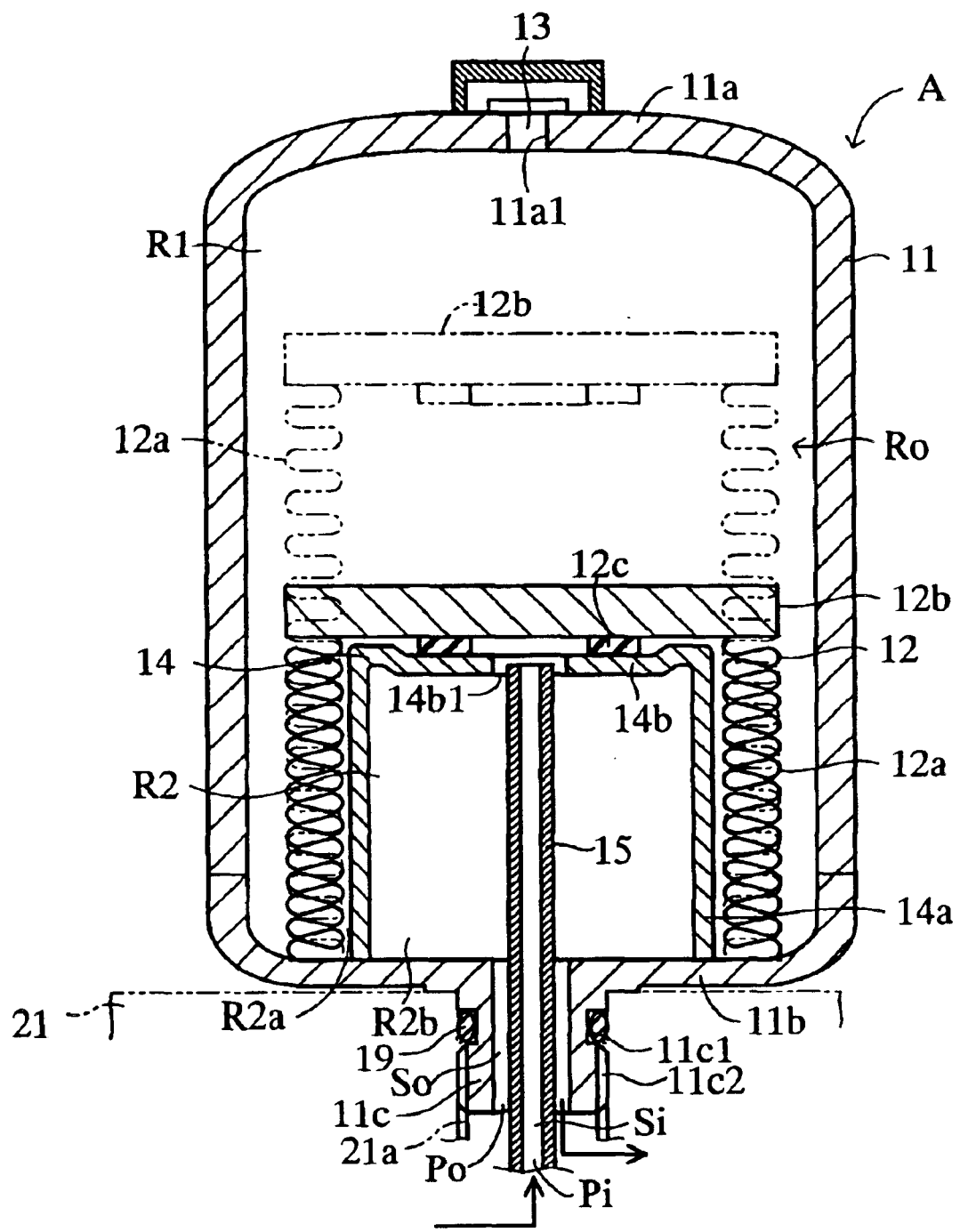
FIG. 2 is an enlarged cross-sectional view of the hydraulic accumulator of FIG. 1.

A preferred embodiment of the present invention will now be described with reference to the drawings. FIGS. 1 and 2 shows a brake hydraulic circuit of an automobile which includes a bellows-type hydraulic accumulator A according to the present invention. In the brake hydraulic circuit, a pressurized working liquid from a hydraulic pump P driven by an electric motor M is accumulated in the accumulator A via a check valve V, and is then supplied to a hydraulic booster H/B, which operates in response to depression of a brake pedal BP and is used to produce assist pressure for a master cylinder M/C. Notably, an unnecessary portion of the working liquid supplied to the hydraulic booster H/B is caused to return to a reservoir R.

In the brake hydraulic circuit, the hydraulic pump P is connected to the reservoir R; and the master cylinder M/C is connected to the reservoir R and a wheel cylinder W/C. The drive of the electric motor M is controlled by means of an electric control unit ECU in accordance with a signal from a pressure sensor PS, which detects the pressure of the pressurized working liquid accumulated in the accumulator A when an ignition switch is in an ON state. Specifically, drive of the electric motor M is stopped when the pressure of the pressurized working liquid reaches a pump OFF pressure, and is resumed when the pressure of the pressurized working liquid drops to a pump ON pressure.

The accumulator A is a metallic bellows-type hydraulic accumulator as shown in FIG. 2, which operates (a bellows 12 extends) when the pressure of the working liquid supplied to a working liquid chamber R2 reaches a preset pressure (a pressure lower than the above-described pump ON pressure but slightly higher than the gas pressure within a gas chamber R1 as measured in the state shown in FIG. 2). The accumulator A includes a shell 11 which forms a pressure space Ro, and a bellows unit 12 which is disposed within the pressure space Ro and which can be extended and contracted.

The shell 11 is constituted by upper and lower shell halves, which are joined together in a liquid-tight state. A plug 13 is fitted in an airtight manner in a gas filling port 11a1 formed in an upper end wall 11a of the shell 11. Further, a cylindrical portion 11c is formed on a lower end wall 11b of the shell 11 in such a manner that the cylindrical portion 11c extends downward from the lower end wall 11b. The cylindrical portion 11c has an O-ring attachment groove 11c1 and an attachment male screw portion 11c2 formed on the outer circumference thereof. After an O-ring 19 is fitted into the O-ring attachment groove 11c1, the attachment male screw portion 11c2 of the cylindrical portion 11c is screwed into a female screw portion 21a of a pump body 21, which serves as a support member, whereby the accumulator A is removably mounted to the pump body 21.

The bellows unit 12 is constituted by a cylindrical, tubular bellows portion 12a which is made of a metal and which extends and contracts mainly in an axial direction; and a movable plate 12b which is made of a metal and is connected in an airtight and liquid-tight state to an upper end of the bellows portion 12a. A lower end of the bellows portion 12a is fixed in an airtight and liquid-tight state to the lower end wall 11b of the shell 11. Thus, the pressure space Ro is divided or sectioned into an outer chamber serving as a gas chamber R1 in which a pressurized gas of a preset pressure is enclosed, and an inner chamber serving as a working liquid chamber R2, which communicates with a liquid inlet port Pi and a liquid outlet port Po. Further, a stay 14 and a pipe 15 are disposed within the bellows unit 12; i.e., within the working liquid chamber R2.

The stay 14 is adapted to divide or section the working liquid chamber R2 into a variable-volume liquid chamber R2a whose volume is variable and a fixed-volume liquid chamber R2b having a fixed volume, and to restrict the degree of contraction of the bellows unit 12. The stay 14 has a cylindrical wall portion 14a that is liquid-tightly fixed to the lower end wall 11b of the shell 11, and an upper end wall portion 14b integrally formed at the upper end of the cylindrical wall portion 14a. Further, a communication port 14b1 is formed in the upper end wall portion 14b of the stay 14 in order to establish communication between the variable-volume liquid chamber R2a and the fixed-volume liquid chamber R2b.

The pipe 15 is coaxially disposed in the cylindrical portion 11c of the shell 11 to pass through the cylindrical portion 11c. The pipe 15 is connected and fixed, at its lower end, to an inflow passage forming portion (not shown) of the pump body 21, to thereby form an inflow passage Si inside the pipe 15 and an outflow passage So outside the pipe 15. A lower end portion of the inflow passage Si communicates with the liquid inlet port Pi, so that pressurized working liquid fed from the hydraulic pump P and containing a pulsation component is supplied to the inflow passage Si. A lower end portion of the outflow passage So communicates with the liquid outlet port Po, so that pressurized working liquid within the fixed-volume liquid chamber R2b is supplied to the hydraulic booster H/B.

Figure 3:
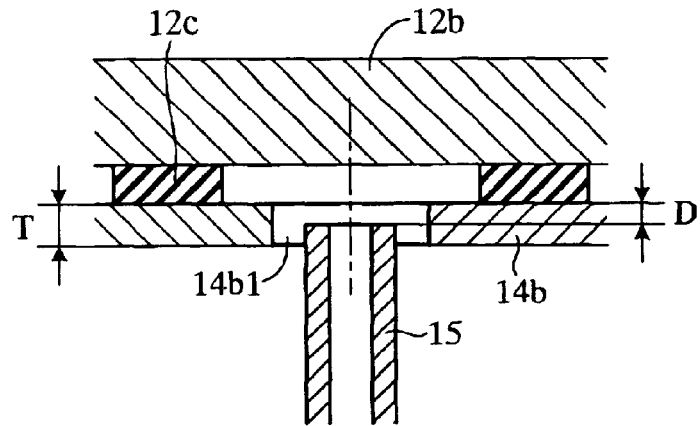
FIG. 3 is an enlarged cross-sectional view of a main portion of the hydraulic accumulator of FIG. 2.

As shown in FIGS. 2 and 3, a tip end (upper end) of the pipe 15 is inserted into the communication port 14b1 of the stay 14, with a predetermined radial clearance formed between the tip end and a wall surface of the communication port 14b1, to thereby enable pressurized liquid to be supplied to the variable-volume liquid chamber R2a from the tip end of the pipe 15 and to be discharged from the variable-volume liquid chamber R2a to the fixed-volume liquid chamber R2b via the radial clearance.

In the present embodiment, an annular seal member 12c is fixedly attached to a lower surface of the movable plate 12b of the bellows unit 12. The seal member 12c can seat on and separate from the upper end wall 14b of the stay 14. When the seal member 12c seats on the upper end wall 14b, the seal member 12c seals off the working liquid within the variable-volume liquid chamber R2a, to thereby prevent excess contractive deformation of the bellows unit 12. When the seal member 12c separates from the upper end wall 14b, the seal member 12c allows the working liquid to flow between the variable-volume liquid chamber R2a and the fixed-volume liquid chamber R2b via the communication port 14b1 provided in the upper end wall portion 14b of the stay 14.

The thus-constructed hydraulic circuit of the present embodiment operates as follows. When an ignition switch is turned ON in a state in which the working liquid chamber R2 of the accumulator A assumes the state shown in FIG. 2 (a state in which the pressure of the working liquid within the fixed-volume liquid chamber R2b is lower than the gas pressure within the gas chamber R1 as measured in the state shown in FIG. 2), the hydraulic pump P is driven by the electric motor M, and working liquid pumped from the reservoir R is supplied to the working liquid chamber R2 of the accumulator A via the check valve V, whereby working liquid is accumulated within the liquid chamber R2.

At this time, as pressurized working liquid is accumulated within the working liquid chamber R2 of the accumulator A, the movable plate 12b moves upward toward the position indicated by an imaginary line in FIG. 2, and the bellows portion 12b of the bellows unit 12 extends. When the pressure within the working liquid chamber R2 reaches the pump OFF pressure, the drive of the hydraulic pump P by the electric motor M is stopped. When the pressure within the working liquid chamber R2 drops to the pump ON pressure because of supply of pressurized working liquid to the hydraulic booster H/B or leakage of pressurized working liquid via the check valve V, the drive of the hydraulic pump P by the electric motor M is resumed, and pressurized working liquid is again accumulated within the working liquid chamber R2 of the accumulator A via the check valve V.

In the accumulator A of the present embodiment, pressurized working liquid is supplied to the variable-volume liquid chamber R2a from the tip end of the pipe 15 inserted into the communication port 14b1 of the stay 14, and is discharged from the variable-volume liquid chamber R2a to the fixed-volume liquid chamber R2b via the radial clearance formed between the pipe 15 and the wall surface of the communication port 14b1. Therefore, pressurized working liquid discharged from the pump P and containing a pulsation component flows smoothly into the variable-volume liquid chamber R2a of the accumulator A and flows smoothly out therefrom, whereby the pulsation component of the pressurized working liquid discharged from the pump P, which component would otherwise cause generation of vibration and noise, are absorbed efficiently through expansion and contraction of the bellows unit 12.

Figure 4:
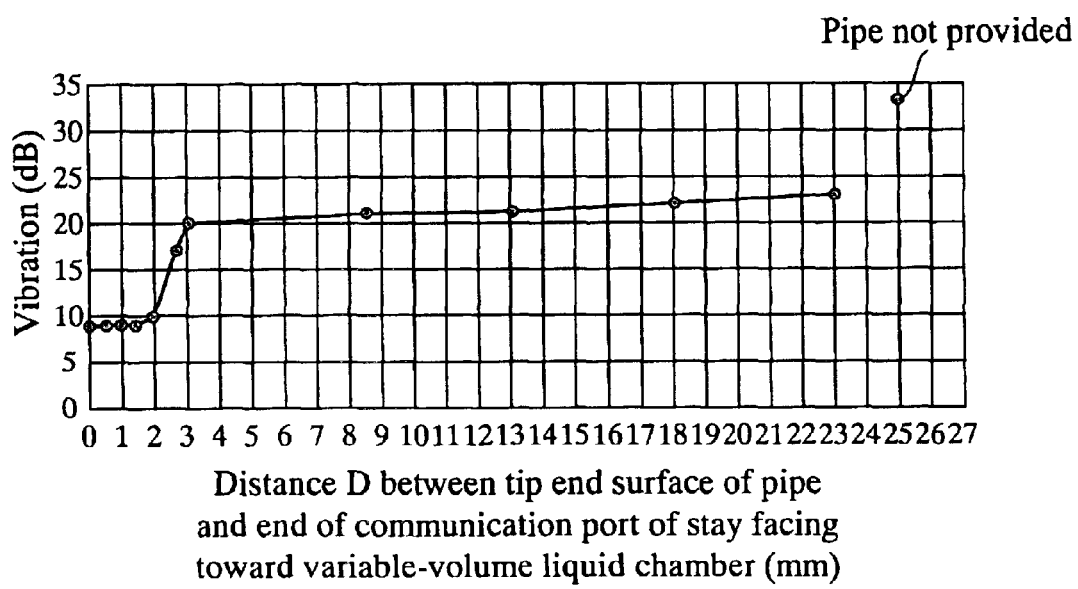
FIG. 4 is a graph showing the results of vibration measurement (the relation between the distance D shown in FIG. 2 and vibration stemming from a pulsation component of pressurized working liquid).

In the case where the distance D (see FIG. 3) between the end of the communication port 14b1 of the stay 14 facing toward the variable-volume liquid chamber and a tip end surface of the pipe 15 is set to 0 to 1.5 mm, as is apparent from the results of a vibration measurement shown in FIG. 4 (vibration of the master cylinder MC was measured), the pulsation component of pressurized working liquid is absorbed quite efficiently through expansion and contraction of the bellows unit 12, whereby vibration which is caused by the pulsation component of the pressurized working liquid can be reduced remarkably.

The results of the vibration measurement shown in FIG. 4 are for the case in which the thickness T of the upper end wall 14b of the stay 14 is 2.5 mm, the diameter of the communication port 14b1 is 10.5 mm, the outer diameter of the pipe 15 is 4.5 mm, and the inner diameter of the pipe 15 is 3 mm. However, the present inventors confirmed that even when the thickness T is greater than 2.5 mm, similar results are obtained (when the distance D is set to 0 to 1.5 mm, vibration which is caused by the pulsation component of the pressurized working liquid decreases remarkably).

Obviously, numerous modifications and variations of the present invention are possible in light of the above teachings. It is therefore to be understood that within the scope of the appended claims, the present invention may be practiced otherwise than as specifically described herein.

What is claimed is:

1. A bellows-type hydraulic accumulator comprising:
   a shell which defines a pressure space;
   a bellows unit capable of extending and contracting and disposed within the pressure space, one end of the bellows unit being fixedly secured to one end wall of the shell in order to divide the pressure space into an outer chamber serving as a gas chamber, in which a pressurized gas is enclosed, and an inner chamber serving as a liquid chamber communicating with a liquid inlet/outlet port formed in the end wall of the shell;
   a stay having a communication port formed therein and disposed within the bellows unit in order to restrict the degree of contraction of the bellows unit and to divide the liquid chamber into a fixed-volume liquid chamber having a fixed volume and a variable-volume liquid chamber whose volume is variable and which communicates with the fixed-volume liquid chamber via the communication port; and
   a pipe inserted into the liquid inlet/outlet port in order to form an inflow passage inside the pipe and an outflow passage outside the pipe, a tip end of the pipe being located within the communication port of the stay with a predetermined radial clearance formed between the tip end and a wall surface of the communication port, to thereby enable pressurized liquid to be supplied to the variable-volume liquid chamber from the tip end of the pipe and to be discharged from the variable-volume liquid chamber to the fixed-volume liquid chamber via the radial clearance.

2. A bellows-type hydraulic accumulator according to claim 1, wherein the distance between the end of the communication port facing toward the variable-volume liquid chamber and a tip end surface of the pipe is set to 0 to 1.5 mm.

* * * * *